United States Patent
Gantman et al.

(10) Patent No.: US 9,118,619 B2
(45) Date of Patent: Aug. 25, 2015

(54) PREVENTION OF CROSS SITE REQUEST FORGERY ATTACKS BY CONDITIONAL USE COOKIES

(75) Inventors: Alexander Gantman, Poway, CA (US); Arun Balakrishnan, San Diego, CA (US); Gregory Gordon Rose, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 13/451,443

(22) Filed: Apr. 19, 2012

(65) Prior Publication Data

US 2013/0117817 A1    May 9, 2013

Related U.S. Application Data

(60) Provisional application No. 61/556,672, filed on Nov. 7, 2011.

(51) Int. Cl.
*G06F 15/16* (2006.01)
*H04L 29/08* (2006.01)
*H04L 29/06* (2006.01)

(52) U.S. Cl.
CPC ............ *H04L 67/02* (2013.01); *H04L 63/1433* (2013.01); *H04L 63/1466* (2013.01); *H04L 63/1483* (2013.01); *H04L 63/168* (2013.01)

(58) Field of Classification Search
CPC . G06F 21/6263; G06F 15/16; H04L 63/1466; H04L 63/1483; H04L 63/168
USPC .............................. 726/4, 1, 27; 709/223, 228
See application file for complete search history.

(56) References Cited

U.S. PATENT DOCUMENTS

| | | | |
|---|---|---|---|
| 6,339,423 B1 * | 1/2002 | Sampson et al. | 715/854 |
| 7,197,568 B2 | 3/2007 | Bourne et al. | |
| 7,594,107 B1 * | 9/2009 | Parkhill | 713/156 |
| 7,779,103 B1 | 8/2010 | Fikes et al. | |
| 7,890,634 B2 | 2/2011 | Jiang et al. | |
| 8,024,781 B2 | 9/2011 | Saunders et al. | |
| 8,176,163 B1 * | 5/2012 | Fikes et al. | 709/223 |
| 2003/0037131 A1 | 2/2003 | Verma | |

(Continued)

FOREIGN PATENT DOCUMENTS

EP         1427160 A2    6/2004

OTHER PUBLICATIONS

International Search Report and Written Opinion—PCT/US2012/063947—ISA/EPO—Jul. 1, 2013.

*Primary Examiner* — Andrew Nalven
*Assistant Examiner* — Mary Li
(74) *Attorney, Agent, or Firm* — Linda G. Gunderson

(57) ABSTRACT

To inhibit cross-site forgery attacks, different types/classes of cookies are used. A first cookie and a second cookie are generated by a web server and provided to a client browser during a web session. The first cookie defines a first set of use conditions for when the first cookie is to be used within the web session. The second cookie defines a second set of use conditions for when the second cookie is to be used within the web session. The client browser determines which (if any) of the first cookie or second cookie to send to the web server based on the use conditions defined within each cookie and the operation(s) sought by the client browser. The web server may grant different or the same privileges to operation(s) being sought by the client browser depending on whether the first or second cookie is sent by the client browser.

30 Claims, 8 Drawing Sheets

(First/Second Cookie Approach)

(56) References Cited

U.S. PATENT DOCUMENTS

| | | | |
|---|---|---|---|
| 2004/0103200 A1* | 5/2004 | Ross et al. | 709/228 |
| 2006/0277596 A1 | 12/2006 | Calvert et al. | |
| 2007/0005606 A1* | 1/2007 | Ganesan et al. | 707/10 |
| 2009/0055912 A1* | 2/2009 | Choi et al. | 726/6 |
| 2009/0249489 A1 | 10/2009 | Livshits et al. | |
| 2010/0198911 A1* | 8/2010 | Zhang et al. | 709/203 |
| 2011/0162072 A1 | 6/2011 | Hay et al. | |
| 2011/0258704 A1* | 10/2011 | Ichnowski | 726/26 |
| 2011/0283110 A1* | 11/2011 | Dapkus et al. | 713/182 |

* cited by examiner (Prior Art - Cross-Site Request Forging)

*(First/Second Cookie Approach)*

*(Conditional Use Cookie Approach)*

PREVENTION OF CROSS SITE REQUEST FORGERY ATTACKS BY CONDITIONAL USE COOKIES

CLAIM OF PRIORITY UNDER 35 U.S.C. §119

The present Application for Patent claims priority to U.S. Provisional Application No. 61/556,672 entitled "Prevention of Cross Site Request Forgery Attacks" filed Nov. 7, 2011, and assigned to the assignee hereof and hereby expressly incorporated by reference herein.

BACKGROUND

1. Field

Various features pertain to deployment of conditional use cookies to communicate information between a client browser/device to a host web server.

2. Background

Hypertext Transfer Protocol (HTTP) is a stateless protocol used to request and deliver web pages over a network. Oftentimes, applications deployed over the network (i.e., web applications) use cookies to keep track of states, where the web server sets an application state in the cookie and provides the cookie to the client (e.g., a client browser on a client device). Cookies may include login and/or authentication information, identification of a user session, user's preferences, tracking browsing activities, shopping cart contents, or anything else that may be accomplished through storing text data on the user's computer. The client can use a cookie in a (subsequent) request to the web server to alert the web server to the current state of the application or web page at the client side. The cookie may be signed by the web server prior to delivery for authentication purposes.

A security risk exists in cross-domain requests, where a web page delivered by the web server may include links or references to other servers. Upon receiving the web page, the client browser may also request the cross linked content from the other servers. However, such cross linked content may include instructions and/or operations that cause the client to perform an unexpected or unwanted action (e.g., logout or password change).

FIG. 1 is a block diagram illustrating a cross-site request forging attack. As illustrated in FIG. 1, a first web server (victim) 104 may provide a client device 102 (i.e., a web browser operating on a user computer) with a web page and associated cookies 108. Such web page may include links 110 to content in the second web server 106 (attacker). Here, the second web server 106 may respond with web content 112 that triggers some action by the first web server 104. For example, the web content 112 sent by the second web server 106 may be a password change, which prompts the client device 102 to forward such cross-site request to the first web server 104 along with all of its cookies 114 for that web page. Consequently, the content 112 received from the second web server 106 by the client device 102 may cause the client device 102 to request the first web server 104 perform a password change for the client device 102 (e.g., user of the client device), even though the client device 102 did not actually desire such password change.

This attack, known as a cross-site request forgery (also known as a one-click attack or session riding) and abbreviated as CSRF, is a type of malicious exploit of a website whereby unauthorized commands are transmitted from a client (e.g., user of client device 102) that the website (first web server 104) trusts.

Several things have to happen for cross-site request forgery to succeed:
1. The attacker targets either a site that doesn't check the referrer header (which is common) or a victim with a browser or plugin bug that allows referrer spoofing (which is rare).
2. The attacker finds a form submission at the target site, or a Uniform Resource Locator (URL) that has side effects, that does something (e.g., transfers money, or changes the victim's e-mail address or password).
3. The attacker determines the right values for all the form's or URL's inputs for the target site; if any of them are required to be secret authentication values or IDs that the attacker can't guess, the attack will fail.
4. The attacker lures the victim to a web page with malicious code while the victim is logged in to the target site.

Individual web users using unmodified versions of the most popular web browsers can do relatively little to prevent cross-site request forgery. Logging out of websites and avoiding their "remember me" features can mitigate CSRF risk; not displaying external images or not clicking links in spam or untrusted e-mails may also help.

Web browser extensions such as RequestPolicy (e.g., for Mozilla Firefox) can prevent CSRF by providing a default-deny policy for cross-site requests. However, this can significantly interfere with the normal operation of many websites.

Therefore, it would be beneficial to provide a security mechanism that allows legitimate cross-site requests to operate while inhibiting cross-site request forgery.

SUMMARY

Cookies that define one or more conditions for their use are provided to a client browser by a web browser during a web session. A first cookie may define a first set of use conditions for when the first cookie is to be used within the web session. The second cookie defines a second set of use conditions for when the second cookie is to be used within the web session. Such "use conditions" may include: (a) whether an operation/request sought is locally or externally triggered, (b) a location of the client device on which the client browser operates, (c) a type of network connection used by the client device, (d) an operating system used by the client device, and/or (e) which external websites are seeking a cross-site request, etc. Such "use conditions" may exclude a cookie expiration. The client browser may determine which (if any) of the first cookie or second cookie to send to the web server based on the use conditions defined within each cookie and the operation(s) sought by the client browser. The web server may grant different or the same privileges to operation(s) being sought by the client browser depending on whether the first or second cookie (or neither) is sent by the client browser.

In one example, a plurality of corresponding cookies (e.g., HTTP cookie, web cookie, browser cookie) may use conditions that distinguish between requests triggered within a client browser on a client device versus requests triggered external to the client browser. For instance, some requests may be "user-initiated" directly (e.g., by typing in a URL into the address bar of the client browser or proving some input in a visited website), while others may be initiated by the content of the host website (e.g., embedded images and scripts). Furthermore, of the requests that are initiated or triggered by web page content, some are requests to the same website from which the web page content came ("same-origin") and some are to different/external websites ("cross-site"). Both "user-initiated" requests and/or "same-origin" requests may be referred as "locally-triggered" requests while "cross-site"

requests may be referred to as "externally-triggered" requests. The first cookie may define a first set of use conditions that restricts its use with only locally-triggered requests, while the second cookie may define a second set of use conditions that restrict its use with only externally-triggered requests. The client browser uses the cookie(s) which use condition(s) is satisfied when sending an operation/request to the web server.

A first method operational on a web server is provided. A web session is established with a client browser operating on a client device. A first cookie and a second cookie are obtained, generated, and/or issued, where the first cookie defines a first set of use conditions for when the first cookie is to be used within the web session, and the second cookie defines second set of use conditions for when the second cookie is to be used within the web session. The first and second cookies are then sent (e.g., concurrently, sequentially, or at different times) to the client browser via a network.

In one implementation, the first cookie may be restricted to be used with locally-triggered requests from the client browser and the second cookie may be restricted to be used with externally-triggered requests from the client browser. For instance, externally-triggered requests may include cross-site requests.

In one example, the web server may receive a request from the client browser that is accompanied by at least one of the first cookie or the second cookie depending on whether the use conditions for the accompanying first cookie or second cookie have been met. The request may be processed according to privileges associated with the accompanying first cookie or second cookie. If the request is accompanied by the first cookie, the request may be allowed by the web server to make state changes to the web session. If the request is accompanied by the second cookie, the request may not be permitted by the web server to make state changes to the web session.

In some implementations, either the first cookie or the second cookie is used in the request from the client browser but not both. The web server depends on the client browser to select and attach the cookie whose conditions are met at the client browser.

In another example, the web server may receive a request from the client browser that is accompanied by both the first cookie and the second cookie. Consequently, the request may be processed according to privileges associated with the first cookie and the second cookie.

In one implementation, the first set of use conditions may define that the first cookie be used with requests locally triggered by the client browser or by requests of the web server itself, and the second set of use conditions may define that the second cookie be used with requests externally triggered at a second website.

In another implementation, the first set of use conditions may define that the first cookie be used with requests external triggered at a first website, and the second set of use conditions may define that the second cookie be used with requests externally triggered at a second website.

In one example, the first cookie may be received at the web server with a request from the client browser if the request is locally-triggered, but neither the first cookie nor second cookie is received at the web server with the request from the client browser if the request is externally-triggered. In another example, the first cookie may be received at the web server with a request from the client browser if the request is externally-triggered, but neither the first cookie nor second cookie is received at the web server with the request from the client browser if the request is locally-triggered.

In some instances, the first cookie may be used if the client browser issues a locally-triggered request to the web server, but no cookie may be used if the client browser issues an externally-triggered request to the web server. The first cookie may be associated with the same or different privileges than the second cookie within the web session.

The first set of use conditions may define that the first cookie be used when the client device has certain characteristics, and the second set of use conditions defines that the second cookie be used when the client device has other characteristics. The characteristics include at least one of: (a) a location of the client device, (b) an operating system used by the client device; and/or (c) a type of network connection used by the client device.

The first cookie and second cookie may be sent to the client browser at the same time or different times. The first and second cookies are independently authenticatable by the web server.

A second method operational on a client browser on a client device is provided. A web session may be established between the client browser/client device and the web server to obtain access to a website. A first cookie and a second cookie may be received at the client browser from the web server, where the first cookie defines a first set of use conditions for when the first cookie is to be used within the web session, and the second cookie defines a second set of use conditions for when the second cookie is to be used within the web session. An operation (e.g., request, message transmission, data transmission, etc.) may be initiated within the web session by sending at least one of the first cookie or the second cookie to the web server.

In one example, the first cookie may restricted to be used with locally-triggered requests from the client browser to the web server, and the second cookie may be restricted to be used with externally-triggered requests from the client browser to the web server. The externally-triggered requests may include cross-site requests.

The client browser may determine which of the first cookie or second cookie to send to the web server based on the use conditions defined within each cookie and the operation sought by the client browser.

The client browser may send a request from the client browser to the web server that is accompanied by at least one of the first cookie or the second cookie depending on whether the use conditions for the accompanying first cookie or second cookie have been met. In one instance, if the request is accompanied by the first cookie, the request is allowed by the web server to make state changes to the web session. In another instance, if the request is accompanied by the second cookie, the request is not permitted by the web server to make state changes to the web session. In some implementations, either the first cookie or the second cookie may be used in the request from the client browser but not both.

In one example, a request may be sent from the client browser that is accompanied by both the first cookie and the second cookie, wherein the request is processed according to privileges associated with the first cookie and the second cookie. In some instance, the first set of use conditions may define that the first cookie be used with requests locally triggered by the client browser or by requests of the web server itself, and the second set of use conditions may define that the second cookie be used with requests externally triggered at a second website. In other instances, the first set of use conditions may define that the first cookie be used with requests external triggered at a first website, and the second set of use conditions may define that the second cookie be used with requests externally triggered at a second website.

In one implementation, the client browser may send the first cookie to the web server with a request if the request is locally-triggered by the client browser, but neither the first cookie nor second cookie is sent to the web server with the request from the client browser if the request is externally-triggered.

In another implementation, the client browser may send the first cookie to the web server with a request if the request is externally-triggered, but neither the first cookie nor second cookie is sent to the web server with the request if the request is locally-triggered. The first cookie may be associated with different or the same privileges than the second cookie within the web session.

The first set of use conditions may define that the first cookie be used when the client device has certain characteristics, and the second set of use conditions may define that the second cookie be used when the client device has other characteristics. The characteristics include at least one of: (a) a location of the client device, (b) an operating system used by the client device; and/or (c) a type of network connection used by the client device.

BRIEF DESCRIPTION OF THE DRAWINGS

Various features, nature and advantages may become apparent from the detailed description set forth below when taken in conjunction with the drawings in which like reference characters identify correspondingly throughout.

DETAILED DESCRIPTION

Figure 1:
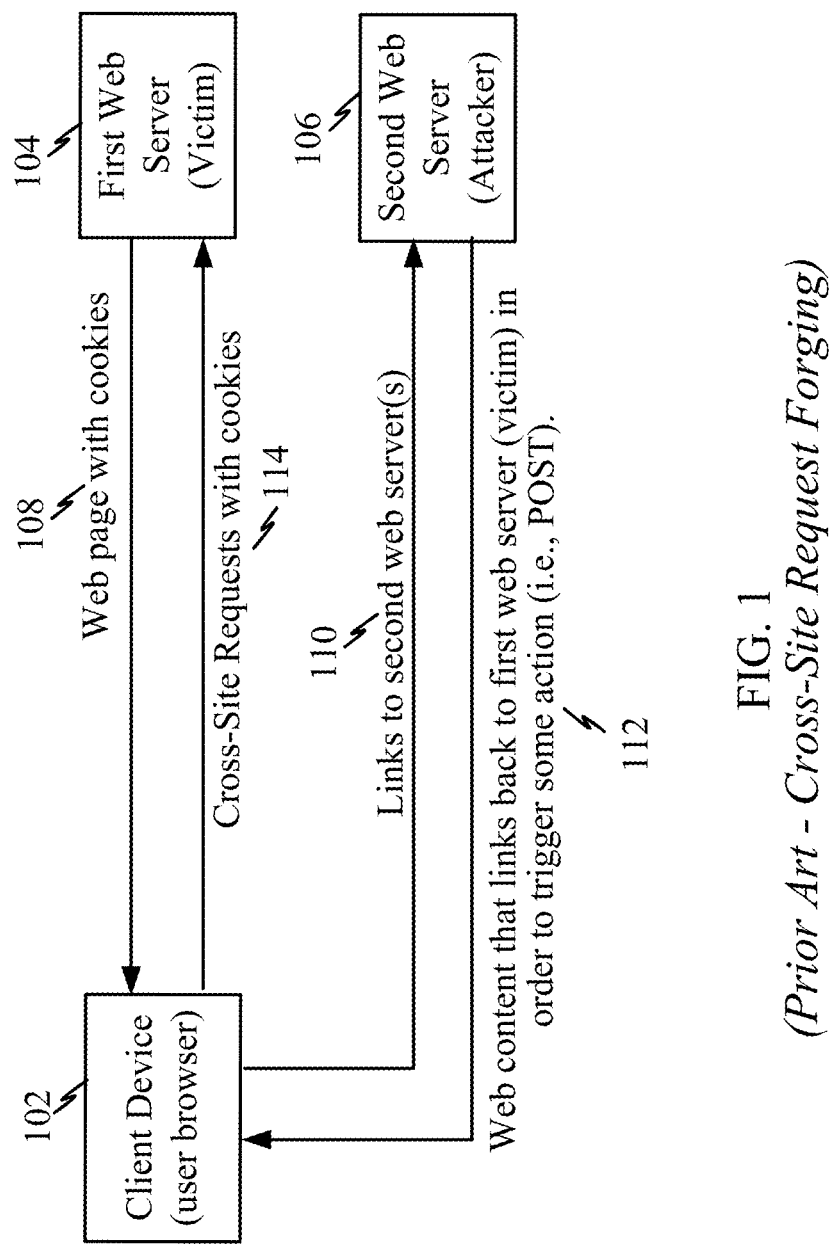
FIG. 1 is a block diagram illustrating a cross-site request forging attack.

In the following description, specific details are given to provide a thorough understanding of the embodiments. However, it will be understood by one of ordinary skill in the art that the embodiments may be practiced without these specific detail. For example, circuits may be shown in block diagrams in order avoid obscuring the embodiments in unnecessary detail. In other instances, well-known circuits, structures and techniques may not be shown in detail in order not to obscure the embodiments.

Overview

A plurality of corresponding cookies (e.g., HTTP cookies, web cookies, browser cookies, etc.) are provided that define one or more conditions for their use during a web session at a client browser. A first cookie may define a first set of use conditions for when the first cookie is to be used within the web session. The second cookie defines a second set of use conditions for when the second cookie is to be used within the web session. Such "use conditions" may include: (a) whether an operation/request sought is locally or externally triggered, (b) a location of the client device on which the client browser operates, (c) a type of network connection used by the client device, (d) an operating system used by the client device, and/or (e) which external websites are seeking a cross-site request, etc. Such "use conditions" may exclude a cookie expiration. The client browser may determine which (if any) of the first cookie or second cookie to send to the web server based on the use conditions defined within each cookie and the operation(s) sought by the client browser. The web server may grant different or the same privileges to operation(s) being sought by the client browser depending on whether the first or second cookie (or neither) is sent by the client browser.

In one example, the operations being sought are requests within web session, but different cookies may be used depending on how/where the request is triggered. Some requests may be "user-initiated" directly (e.g., by typing in a URL into the address bar of the client browser or proving some input in a visited website), while others may be initiated by the content of the host website (e.g., embedded images and scripts). Furthermore, of the requests that are initiated or triggered by web page content, some are requests to the same website from which the web page content came ("same-origin") and some are to different/external websites ("cross-site"). Both "user-initiated" requests and/or "same-origin" requests may be referred as "locally-triggered" requests while "cross-site" requests may be referred to as "externally-triggered" requests. In order to distinguish between "locally-triggered" requests and "externally-triggered" requests, at least two different cookies may be used between the host website and the client browser.

In one exemplary, to inhibit or thwart cross-site forgery attacks, two different types or classes of cookies may be used by a client browser depending on whether a website request originates at the client browser (locally-triggered request) or at a different device/server (e.g., externally-triggered request). Upon a client browser requesting a webpage from a first web server, the first web server may setup or provide a first (e.g., private) cookie and a second (e.g., public) cookie to the client browser. The first (private) cookie may be used by the client browser for requests to the first web server that are locally-triggered. The second (public) cookie may be used by the client browser for requests to the first web server that are externally-triggered (e.g., by a second server contacted for a cross-site request). The first web server may restrict operations sought by a request depending on whether the first or second cookie is received with the request or associated with a particular request. For instance, a request for access to user account information may be provided only if the first cookie is received rather than the second cookie.

As used herein, a "cookie" (e.g., also known as an HTTP cookie, web cookie, or browser cookie) is, for example, a digital object used to maintain state information, browsing history, and/or other data related to a web session between a web server and a browser in a client device. For instance, a web server hosting a website sends a browser on a client device one or more webpages along with one or more cookies that serve to store, reflect, or exchange state information between the client browser and the hosting web server. In various examples, the state information may be used for authentication, identification of a user session, user's preferences, shopping cart contents, or anything else that can be accomplished through storing data on the client device. The cookie may be modified/updated by a client device, client browser, and/or web server and transmitted between the client device and web server to convey state information and/or changes for the web session.

Exemplary Network Environment

Figure 2:
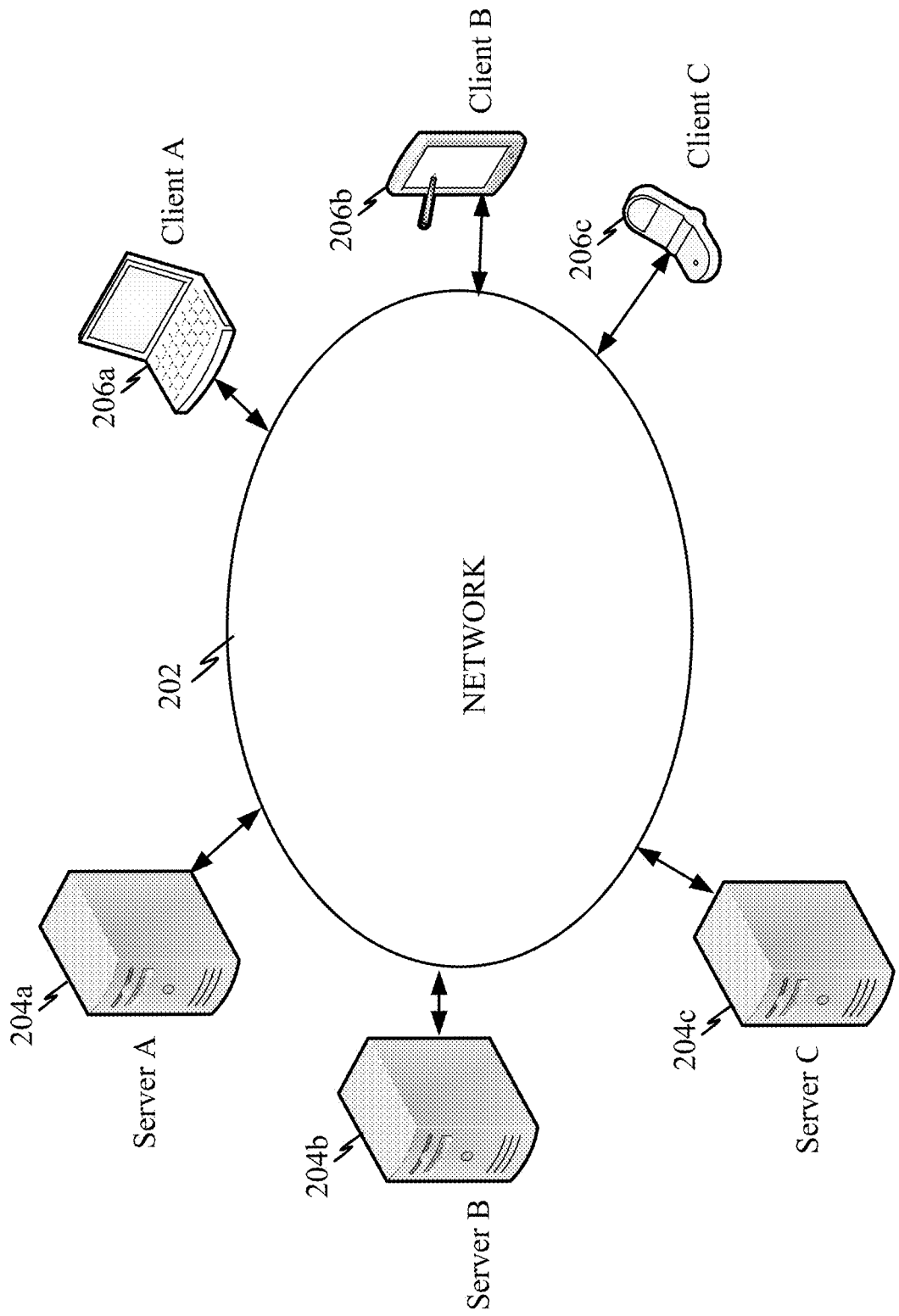
FIG. 2 is a diagram illustrating an exemplary network environment in which one or more features to inhibit cross-site request forging attacks may be implemented.

FIG. 2 is a diagram illustrating an exemplary network environment in which one or more features to inhibit cross-site request forging attacks may be implemented. A network 202 (e.g., data or communication network, packet-switched network, internet, wireless network, a plurality of networks, etc.) may serve to facilitate communications between multiple devices (e.g., web servers, user computers, etc.). Here, a plurality of web servers 204a, 204b, and/or 204c may provide content to one or more client devices 206a, 206b, and/or 206c (e.g., user laptops/computers, tablets, mobile phones, etc.). For instance, a browser operating at the first client device 206a may request a website content from a first web server A 204a. In response, the first server A 204a sends the requested website content to the first client device 206a where the browser displays such content to a user. Additionally, the browser may also execute instructions/commands received as part of the website content, such as linked content from a second web server B 204b. As previously noted, the second web server 204b may send content (e.g., commands, instructions, etc.) that causes the client browser to perform operations unintended by the first client device 206a. Such unintended operations may include, for example, externally-triggered requests (i.e., cross-site requests). For instance, the content from the second web server 204b may trigger or request a password change for a user of the first client device 206a at the first web server A 204a. However, by using different cookies for requests initiated at the client device (e.g., user triggered/initiated/originated requests) versus requests initiated elsewhere (e.g., externally triggered/initiated/originated requests, request initiated by second web server B 204b), these different requests may be distinguished by the first web server A 204a. Depending on the type of request (e.g., a change password request versus a content delivery request), the first web server A 204a may deny requests that seek a change in, for example, session or account information not accompanied by a cookie that indicates that such request was locally-triggered at the client device 206a (e.g., user-initiated or same-origin initiated) rather than externally-triggered by a different web server 204b or 204c.

Exemplary Implementations of Conditional Use Cookies

Figure 8:
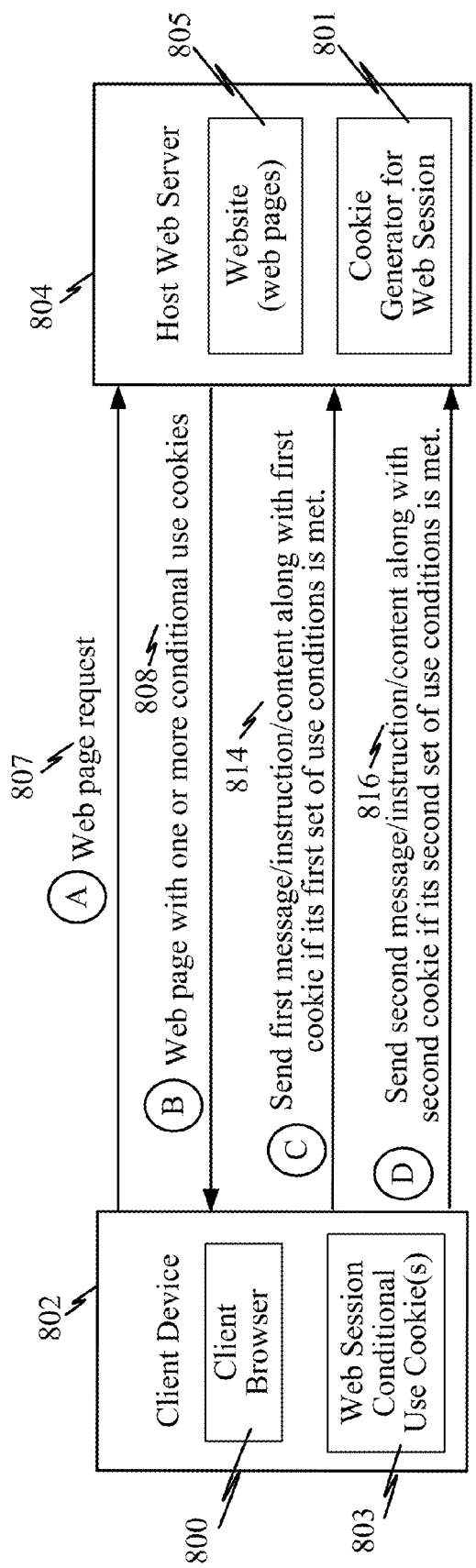
FIG. 8 is a block diagram illustrating a system where conditional use cookies are employed within a web session to allow the client browser to indicate to the serving web server one or more conditions.

FIG. 8 is a block diagram illustrating a system where conditional use cookies are employed within a web session to allow the client browser to indicate to the serving web server one or more conditions. In particular, rather than modifying the cookie to include information therein (e.g., modifying the content of the cookie), the use of a particular cookie (e.g., from a plurality of cookies) by the client browser indicates that conditions defined by the cookie have been met at the client browser. Therefore, receipt of such cookie by the corresponding web server can serve to convey certain information or conditions from client browser to the web server.

In FIG. 8, a client device 802 (implementing a client browser 800) may establish a web session with a host web server 804 by requesting 807 a web page a website 805 hosted by the host web server 804 (e.g., one or more web pages). In response 808, the host web server 804 may obtain, issue, and/or generate one or more conditional use cookies (e.g., cookie generator 801) and sends them to the client device 802. Each of the one or more conditional use cookies may define one or more conditions under which it may be used. For example, a first cookie may define a first set of use conditions for when the first cookie is to be used within the web session. Similarly, a second cookie may define a second set of use conditions for when the second cookie is to be used within the web session.

The client device 802 may store the conditional use cookies 803 and use them only if their conditions are satisfied. Note that the cookies may be used with various types of messages from the client browser 800 (executed by the client device 802) to the host web server 804 to convey and/or assert a condition from the client browser 800 to the host web server 804. For instance, a first message/instruction/content may be sent 814 from the client browser 800 to the host web server 804 along with a first cookie if a first set of use conditions for the first cookie is met. For example, the first set of use conditions for the first cookie may be used to indicate a client device characteristic (e.g., a location of the client device, an operating system used by the client device, a type of network connection used by the client device, etc.) or a condition under which the first message/instruction/content occurs (e.g., locally-triggered, etc.). Similarly, a second message/instruction/content may be sent 814 from the client browser 800 to the host web server 804 along with a second cookie if a second set of use conditions for the second cookie is met. For example, the second set of use conditions for the second cookie may be used to indicate a different client device characteristic or a condition under which the second message/instruction/content occurs (e.g., externally-triggered, etc.). In one example, the use conditions may be defined within a cookie itself so that a receiving client browser can determine when and/or if to use the cookie and under what conditions.

The conditional use cookies may be used in various implementations and/or for various purposes.

Figure 3:
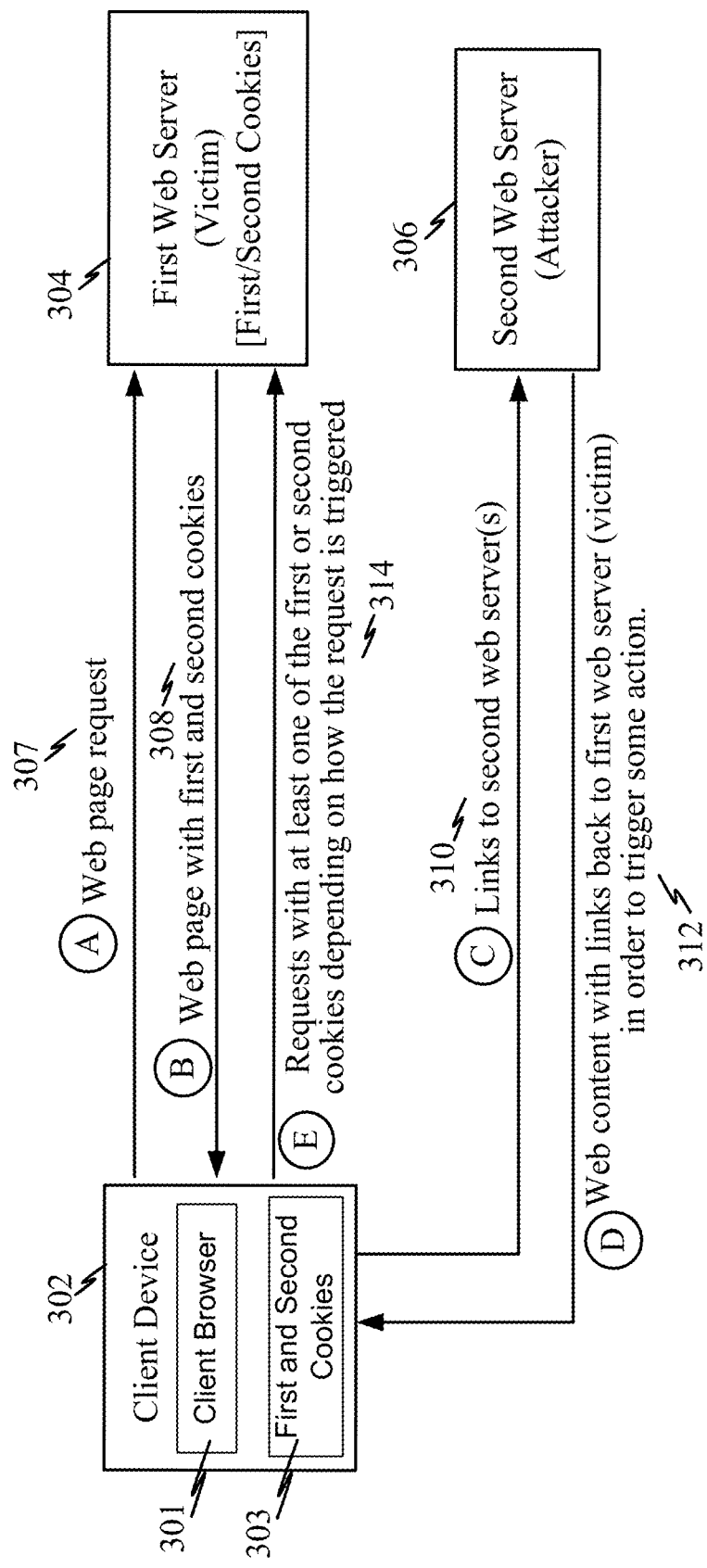
FIG. 3 is a block diagram illustrating a multi-cookie security approach to inhibit cross-site request forging attacks.

FIG. 3 is a block diagram illustrating a multi-cookie security approach to inhibit cross-site request forging attacks. This may be one example of the broader concept of conditional use cookies illustrated in FIG. 8. According to one feature, a client device 302 may request 307 a website (e.g., one or more web pages) from a first web server 304. In response 308, the first web server 304 hosting the website may issue (e.g., delivered with a web page) a first cookie (e.g., private cookie, primary cookie, administrative cookie, etc.) and a second cookie (e.g., public cookie, secondary cookie, guest cookie, etc.) to the client device 302 (e.g., browser operating in the client device). For instance, such cookies 303 may be issued for each web session with the browser operating on the client device 302 and/or may expire when the session ends or after a certain amount of time. To thwart cross-site request forging, the client browser 301 on the client device 302 uses the first cookie for locally-triggered requests, but uses the second cookie for externally-triggered requests, such as by a cross-site request by the second web server 306. The first and second cookies 303 may be unique to each browsing session, each browsed website, and/or for each client device 302.

In HTTP, the GET command is used to request a specified resource but should not make/cause any state changes for a website. The POST command is used to request a change in the website state. At the first web server 304, the first (e.g., private) cookie may allow POST commands (e.g., requests) to be processed by the web server but the second (e.g., public) cookie does not. The client browser 301 on the client device 302 knows if/when it receives an externally triggered request versus a locally triggered request. That is, during a web session, the client browser 301 on the client device 302 knows when a particular request has been triggered locally (e.g., by the user action or a same-origin request) or externally triggered (e.g., cross-site request by the second web server 306). In one example, the client browser 301 may know whether it is responding to user input or to the content of the web page it is processing. Also, in the case of responding to content of the web page it is processing, the client browser may know the origin of the web page and the destination of the embedded requests. If origin of the web page and destination of embedded request are not the same, then the request is an externally-triggered request (e.g., cross-site request).

In this example, the content received by the client device 302 from the first web server 304 may include references (e.g., links, scripts, etc.) to related content from a second web server 306. Consequently, the client device 302 links to the second web server 310 to obtain such related content. In response to this link 310, the second web server 306 may send the requested web content with links 312 back to the first web server 304 in order to trigger some action (e.g., password change request, etc.). Thus, if/when a link back (e.g., triggering a cross-site request to the first web server 304) is received from the second web server 306, the browser on the client device 302 attaches the second (e.g., public) cookie to the request 314 and forwards this cross-site request to the first web server 304. Note that the "link back" received from the second web server 306 may be an instruction and/or command that causes the browser 301 on the client device 302 to send the request 314 to the first web server 304.

Because the first web server 304 issued the first and second cookies to the browser on the client device 302, it knows the different purposes/privileges/conditions associated with each of these cookies. For example, the first web server 306 may know that if the second (e.g., public) cookie is attached to a request it is an externally triggered request and, thus, it should not process any POST command (or any other command that may cause a website state change). Consequently, this dual cookie approach allows the first web server 304 to know whether a particular request is initiated by the browser on the client device 302 or whether it is a cross-site request (e.g., initiated by the second web server 306). In the example of FIG. 3, the request 312 from the second web server 306 would be forwarded by the client device 302 with its public cookie, thereby preventing any changes to the state of the session.

Exemplary Web Server

Figure 4:
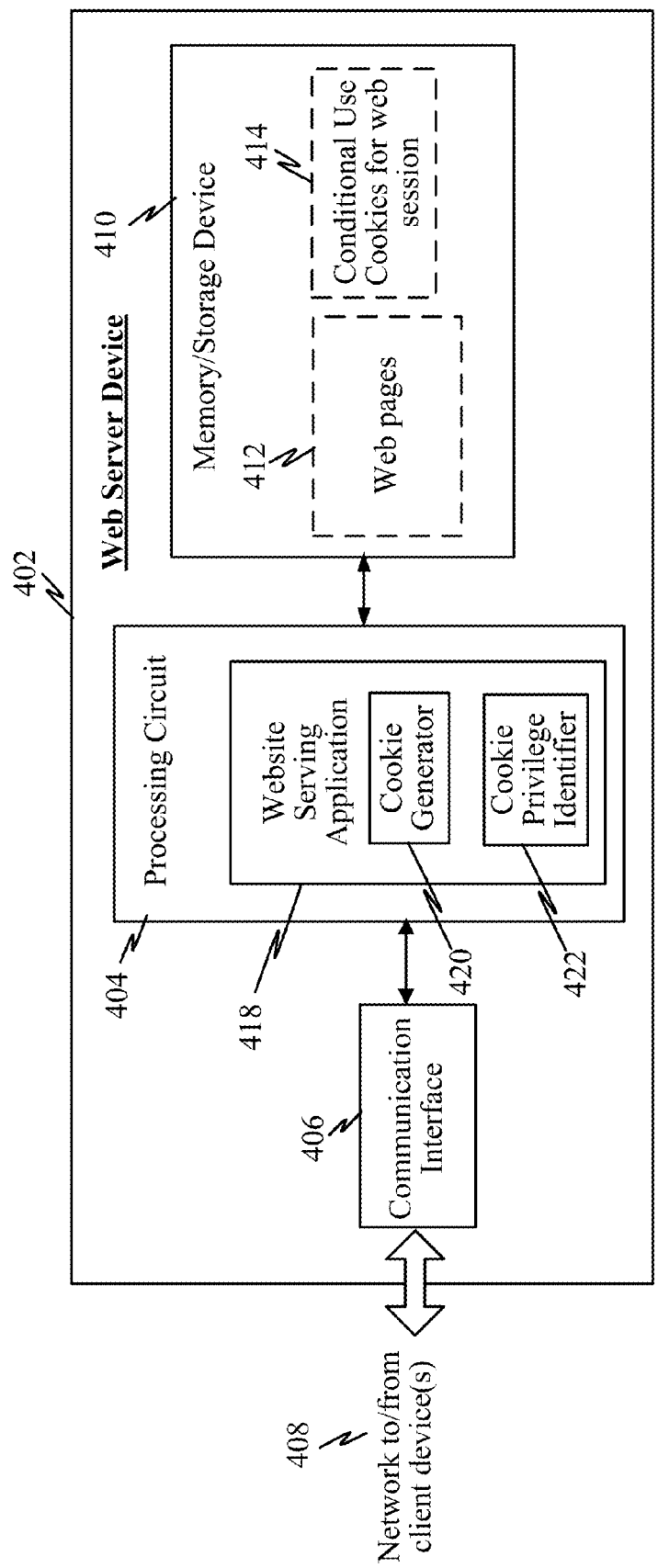
FIG. 4 is a block diagram illustrating a web server device that may be configured to inhibit cross-site request forging attacks by using conditional-use cookies between a web server and a client device/browser.

FIG. 4 is a block diagram illustrating a web server device 402 that may be configured to inhibit cross-site request forging attacks by using conditional-use cookies between a web server and a client device/browser. The web server 402 may include a processing circuit 404 coupled to a communication interface 406 and/or a memory/storage device 410. The communication interface 406 may include a transmitter and/or receiver circuit that allows the web server 402 to communicate with one or more client devices over a network (e.g., wired network, wireless network, etc.). The processing circuit 404 may execute a website serving application 418 that receives messages/operations/data from client devices (or browsers operating in such client devices) and may also provide requested information (e.g., web page content, etc.) to the client device(s)/browser(s). As part of, or independent of, the website serving application 418, the web server 402 may include a cookie generator 420 that generates one or more conditional use cookies for each web session. Also, to ascertain whether a received request accompanied by a cookie should be granted or denied, a cookie privilege identifier 422 may be configured to ascertain a privilege level for a cookie accompanying the request. The memory/storage device 410 may serve to store one or more web pages 412 and may also store the conditional use cookies 414 for each web serving session with one or more clients (e.g., client browsers operating on client devices).

Upon establishing or during al web session with a client device (or client browser), the web server 402 may provide cone or more conditional use cookies (i.e., a corresponding cookie pair) to the client device (or client browser). For instance, a first cookie may be used by the client device (or client browser) when sending locally-triggered requests to the web server 402. That is, the first cookie may define that it may only be used when a locally-triggered request occurs (among other use conditions). A second cookie may be used by the client device when sending externally-triggered requests to the web server 402. That is, the second cookie may define that it may only be used when an externally-triggered request occurs (among other use conditions). The web server 402 may ascertain which cookie is being used with a request from the client device/browser and either allow/deny a request based on which cookie is being (e.g., privileges associated the cookie) used and/or the purpose of the request.

Figure 5:
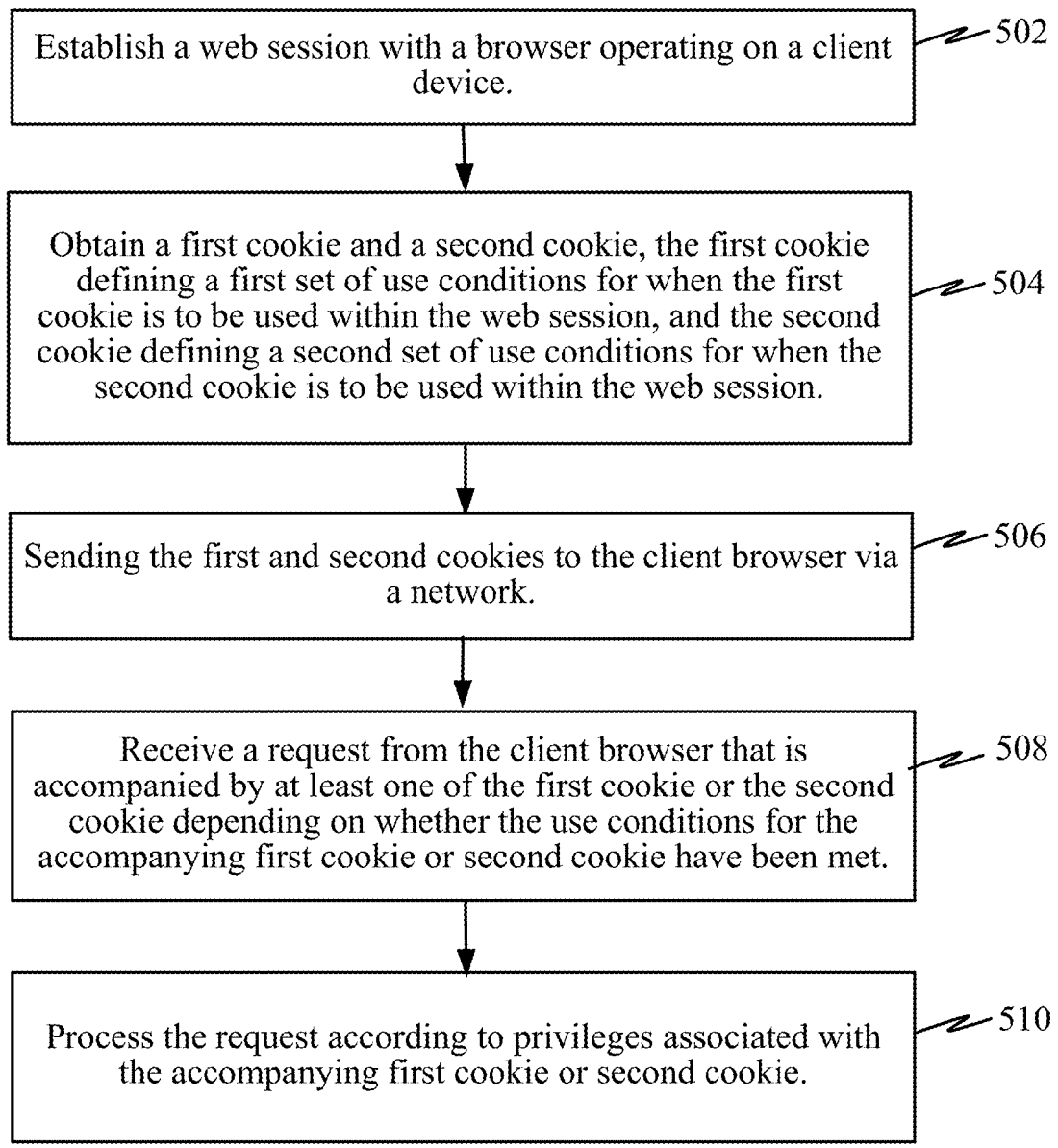
FIG. 5 is a flow diagram of a method operational in the web server to inhibit cross-site request forging attacks by using conditional use cookies.

FIG. 5 is a flow diagram of a method operational in the web server to inhibit cross-site request forging attacks by using conditional use cookies. A web session may be established between the web server and a client browser operating on a client device 502. A first cookie and a second cookie are obtained by the web server, the first cookie defining a first set of use conditions for when the first cookie is to be used within the web session, and the second cookie defining a second set of use conditions for when the second cookie is to be used within the web session 504. The first and second cookies are then sent to the client browser via a network 506.

In one example, the first cookie may be restricted to be used with locally-triggered requests from the client browser and the second cookie is restricted to be used with externally-triggered requests from the client browser. The externally-triggered requests may include cross-site requests.

A (subsequent) request may be received by the web server from the client browser that is accompanied by at least one of the first cookie or the second cookie depending on whether the use conditions for the accompanying first cookie or second cookie have been met 508. The request may then be processed by the web server according to privileges associated with the accompanying first cookie or second cookie 510. If the request is accompanied by the first cookie, the request may be allowed by the web server to make/cause state changes to the web session. If the request is accompanied by the second cookie, the request may not be permitted by the web server to make/cause state changes to the web session. In some examples, either the first cookie or the second cookie may be used in the request from the client browser but not both. The web server may depend/rely on the client browser to select and attach the cookie whose conditions are met at the client browser. That is, the web server may not have any way to independently verify whether the cookie conditions are satisfied, but instead relies on the browser to verify that the conditions defined by a cookie are met.

In an alternative example, a (subsequent) request may be received from the client browser that is accompanied by both the first cookie and the second cookie. The web server may then process the request according to privileges associated with the first cookie and the second cookie.

According to a first example, the first set of use conditions may define that the first cookie be used with requests locally triggered by the client browser or by requests of the web server itself, and the second set of use conditions may define that the second cookie be used with requests externally triggered at a second website.

According to a second example, the first set of use conditions may define that the first cookie be used with requests external triggered at a first website, and the second set of use conditions may define that the second cookie be used with requests externally triggered at a second website.

According to one aspect, the first cookie may be received at the web server with a (subsequent) request from the client browser if the request is locally-triggered, but neither the first cookie nor second cookie may be received at the web server with the request from the client browser if the request is externally-triggered. That is, the web server assumes that the request is externally-triggered from the absence of an accompanying cookie.

According to another aspect, the first cookie may be received at the web server with a (subsequent) request from the client browser if the request is externally-triggered but neither the first cookie nor second cookie may be received at the web server with the request from the client browser if the request is locally-triggered. That is, the web server assumes that the request is locally-triggered from the absence of an accompanying cookie.

In another example, the first cookie may be used if the client browser issues a locally-triggered request to the web server, but no cookie may be used if the client browser issues an externally-triggered request to the web server. For instance, the absence of an accompanying cookie with a request may be understood (at the receiving web server) to mean that it is an externally-triggered request.

In various implementations, the first cookie may be associated with the same or different privileges within the web session than the second cookie. For instance, requests accompanied by the first cookie may be permitted to make changes to an account or session state while the second cookie may not be permitted to make changes. Alternatively, both the first and second cookies may be permitted the same privileges but the presence of the first cookie may indicate that a request was triggered by a first external web server while the presence of the second cookie may indicate that the request was triggered by a second external web server. Thus, the first/second cookies themselves may include or define the condition that it be used only under certain conditions (e.g., when a request is triggered by a particular web server, or locally versus externally triggered, or other condition(s)).

In yet another example, the first set of use conditions may define that the first cookie be used when the client device has certain characteristics, and the second set of use conditions may define that the second cookie be used when the client device has other characteristics. For instance, the characteristics may include at least one of: (a) a location of the client device, (b) an operating system used by the client device, and/or (c) a type of network connection used by the client device.

According to other various aspects, the first cookie and second cookie may be sent to the client browser at the same or different times. The web server may contemporaneously (e.g., same time, overlapping times, etc.) issue, generate, send and/or maintain different conditional use cookies. The first cookie and second cookie may be issued and/or maintained concurrently or at different times but may exist at least in an overlapping time period (i.e., contemporaneously). In one example, the first cookie may be generated and sent to the web browser separate and independent from the second cookie. In another example, the first and second cookies may have different expiration and/or renewal periods.

Because the web server generated the conditional use cookies, the first and second cookies are independently authenticatable by the web server. In some instances, the first and second cookies may be contemporaneously generated and/or issued to the client device (e.g., client browser) by the web server. In other instances, the first and second cookies may be generated and/or issued to the client device at different times. However, the first and second cookies may exist contemporaneously, thereby permitting a client browser to select between them depending on whether an operation (e.g., request to a web server) is locally-initiated (e.g., within the web browser or within the client device) or externally-initiated (e.g., from outside the web browser or client device).

Exemplary Client Device

Figure 6:
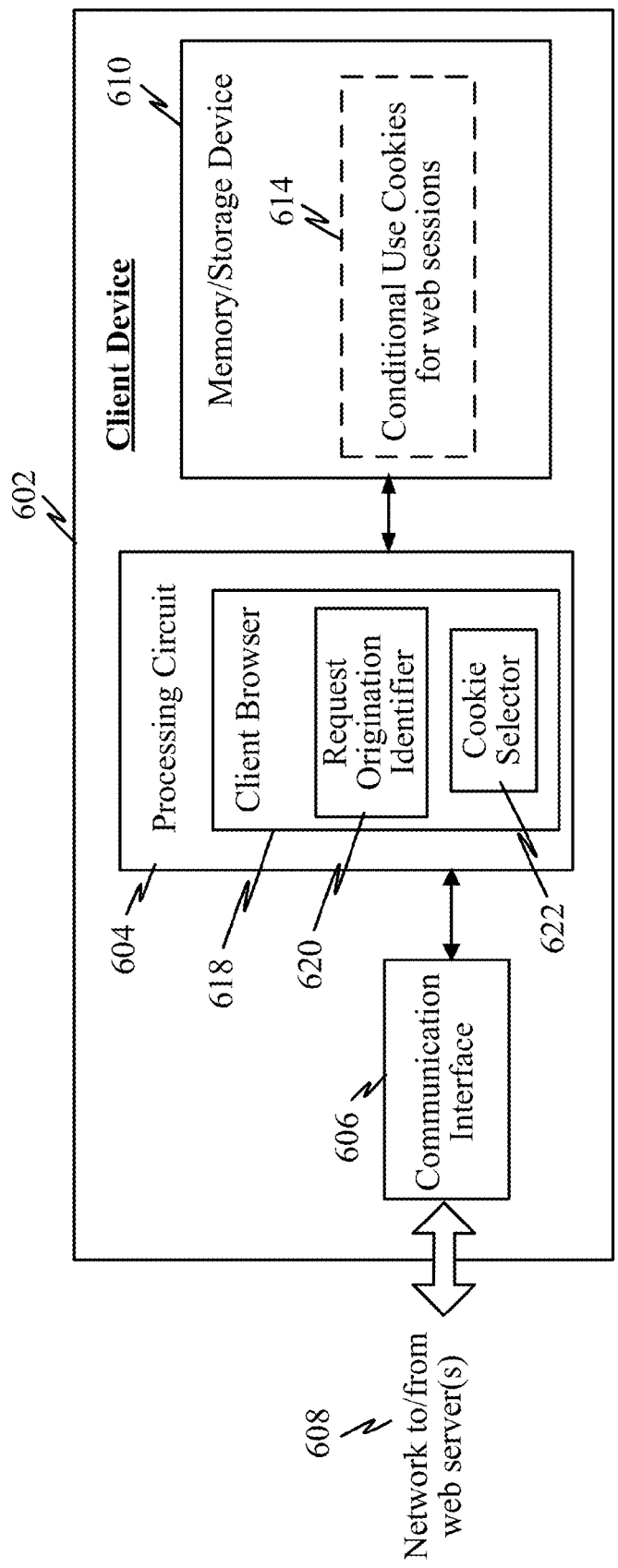
FIG. 6 is a block diagram illustrating a client device that may be configured to inhibit cross-site request forging attacks by using one or more conditional use cookies for web sessions with a host web server.

FIG. 6 is a block diagram illustrating a client device that may be configured to inhibit cross-site request forging attacks by using one or more conditional use cookies for web sessions with a host web server. The client device 602 may include a processing circuit 604 coupled to a communication interface 606 and/or a memory/storage device 610. The communication interface 606 may include a transmitter and/or receiver circuit that allows the client device 602 to communicate with one or more web servers over a network.

In one example, the processing circuit 604 may execute a client browser 618 that is configured to generate and send requests to one or more web servers. As part of, or independent of, the client browser 618, a request origination identifier 620 may be configured to identify or ascertain whether a request is triggered locally at the client browser 618 (or client device 602) or is triggered external to the client device 602. Depending on where the request is triggered, a cookie selector 622 may select either the first cookie or the second cookie. The memory/storage device 610 may serve to store pairs of cookies 614 for each session with one or more web servers.

Upon establishing an initial session with a web server (or web serving application), the client device 602 may receive a first cookie (e.g., defining a first set of use conditions) and/or a second cookie (e.g., defining a second set of use conditions) from the web server. Prior to sending a message/instruction/data to the web server, the client browser 620 may ascertain which (if any) use conditions for the cookies have been satisfied or met (e.g., based on the message/instruction/data sought). The client browser may attach the cookies whose conditions are satisfied to the message/instruction/data to the web server. In one example, the first and second cookies may be used to distinguish whether a request is locally-trigger or externally-triggered. The first cookie may be used by the client device (or client browser) for requests locally-triggered at the client device (or client browser) while the second cookie may be used by the client device with requests triggered external to the client device (or client browser). The web server may determine which cookie is being used in a request and either allow/deny a request based on which cookie is being used. Note that conditional use cookies may serve to distinguish among various conditions and/or characteristics at the client browser and/or client device.

Figure 7:
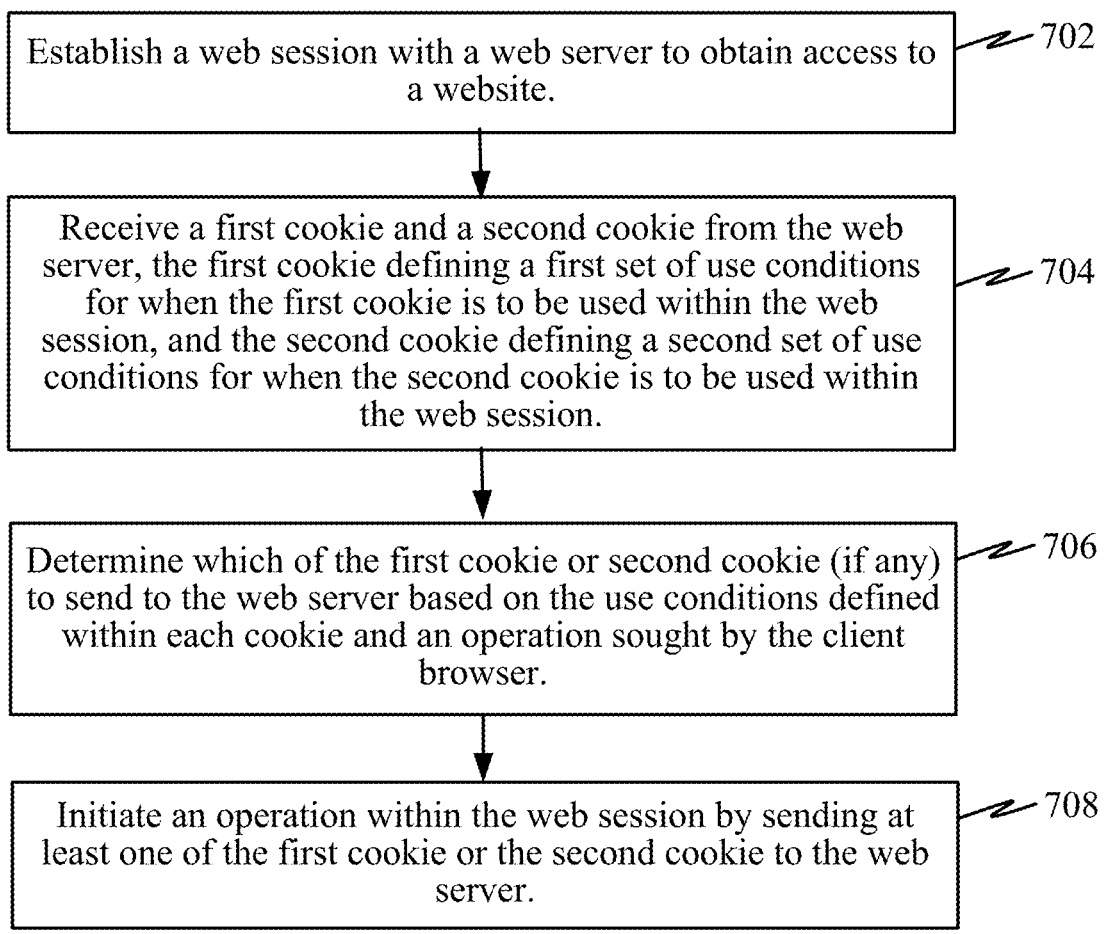
FIG. 7 is a flow diagram of a method operational in the client device that inhibits cross-site request forging attacks by using conditional use cookies.

FIG. 7 is a flow diagram of a method operational in the client device that inhibits cross-site request forging attacks by using conditional use cookies. A client browser (operating on the client device) may establish a web session with the web server to obtain access to a website 702. Either upon establishing the web session or during the webs session, the client browser may receive a first cookie and a second cookie from the web server, the first cookie defining a first set of use conditions for when the first cookie is to be used within the web session, and the second cookie defining a second set of use conditions for when the second cookie is to be used within the web session 704. The first and second cookies may be received at the same or different time (e.g., concurrently, contemporaneously, etc.). The client browser may initiate an operation within the web session by sending at least one of the first cookie or the second cookie to the web server 708. Such "operation" may include a message, data, instruction, command, request, and/or content transmission from the client browser to the (host) web server.

In one example, the first cookie may be restricted to be used with locally-triggered requests from the client browser to the web server, and the second cookie may be restricted to be used with externally-triggered requests from the client browser to the web server. The externally-triggered requests may include cross-site requests. Such "requests" may include commands/instructions seeking to change a state or information related to the web session, a user, and/or an account.

According to one aspect, the client browser may determine which of the first cookie or second cookie (if any) to send to the web server based on the use conditions defined within each cookie and/or the operation sought by the client browser 706.

In one example, the operation may be a request from the client browser to the web server that is accompanied by at least one of the first cookie or the second cookie depending on whether the use conditions for the accompanying first cookie or second cookie have been met. In one instance, if the request is accompanied by the first cookie, the request is allowed by the web server to make state changes to the web session. In another instance, if the request is accompanied by the second cookie, the request is not permitted by the web server to make state changes to the web session.

According to one implementation, either the first cookie or the second cookie may be used in the request from the client browser but not both.

According to one aspect, sending a request from the browser that is accompanied by both the first cookie and the second cookie, wherein the request is processed according to privileges associated with the first cookie and the second cookie.

According to a first example, the first set of use conditions may define that the first cookie be used with requests locally triggered by the client browser or by requests of the web server itself, and the second set of use conditions may define that the second cookie be used with requests externally triggered at a second website.

According to a second example, the first set of use conditions may define that the first cookie be used with requests external triggered at a first website, and the second set of use conditions may define that the second cookie be used with requests externally triggered at a second website.

In one implementation, the first cookie may be sent by the client browser/device to the web server with a request if the request is locally-triggered by the client browser, but neither the first cookie nor second cookie may be sent to the web server with the request from the client browser if the request is externally-triggered.

In another implementation, the first cookie may be sent by the client browser/device to the web server with a request if the request is externally-triggered, but neither the first cookie nor second cookie is sent to the web server with the request if the request is locally-triggered.

According to another feature, the first cookie may be associated with the same or different privileges than the second cookie within the web session.

The first set of use conditions may define that the first cookie be used when the client device has certain characteristics, and the second set of use conditions may define that the second cookie be used when the client device has other characteristics. The characteristics may include at least one of: (a) a location of the client device, (b) an operating system used by the client device, and/or (c) a type of network connection used by the client device.

While the example illustrated in FIGS. 2-8 disclose the use of conditional use cookies to distinguish between, for example, locally-triggered requests (e.g., within a browser operating in the client device) or externally-triggered requests (e.g., from external devices), other implementations may expand this concept. For example, a multi-cookie system may be employed where a subset of servers is available. A Host web server may provide three conditional use cookies to a client browser operating on the client device during a web session. The client device may use a first cookie when sending requests from the client device to a host web server, where such request was initiated/triggered by the client device (or the browser operating therein). The client device may use a second cookie when sending requests from the client device to the host web server, where such request was initiated/triggered a first external server (e.g., based on a first trust level). Lastly, the client device may use a third cookie when sending requests from the client device to the host web server, where such request was initiated/triggered a second server (e.g., based on a second trust level). Note that the privilege assigned to the first, second, and/or third cookies may be the same or different, but attaching a particular cookie to a request from the client browser/device to the host web server allows the host web server to know a condition/characteristic of such request by the mere presence of such cookie (e.g., without necessarily modifying the content of a cookie, but merely attaching the correct cookie). The use conditions associated with each cookie may define when to use which cookie (e.g., under what conditions).

One or more of the components, steps, features and/or functions illustrated in the FIGS. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described in the FIGS. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a web server, comprising:
   establishing a web session with a client browser operating on a client device;
   generating at the web server a first cookie and a second cookie, wherein the first cookie is restricted to be used with a locally-triggered request, from the client browser to the web server, that is user-initiated or triggered by web content received by the client browser from the web server, and wherein the second cookie is restricted to be used with an externally-triggered request, from the client browser to the web server, that is triggered by web content received by the client browser from a website external to the web server;
   sending the first and second cookies to the client browser via a network;
   receiving a request from the client browser that is accompanied by a cookie;
   determining whether the accompanying cookie is the first cookie or the second cookie; and
   wherein the accompanying cookie is selected by the client browser based on the client browser's determination on whether the request is locally or externally triggered.

2. The method of claim 1, wherein the externally-triggered request includes a cross-site request.

3. The method of claim 1, further comprising:
   processing the request according to privileges associated with the accompanying first cookie or second cookie.

4. The method of claim 1, wherein if the request is accompanied by the first cookie, the request is allowed by the web server to make state changes to the web session.

5. The method of claim 1, wherein if the request is accompanied by the second cookie, the request is not permitted by the web server to make state changes to the web session.

6. The method of claim 1, where either the first cookie or the second cookie is used in the request from the client browser but not both.

7. The method of claim 1, wherein the first cookie is associated with first privileges which are different from second privileges associated with the second cookie within the web session.

8. The method of claim 1, wherein the first cookie and the second cookie are associated with same privileges within the web session.

9. The method of claim 1, wherein the first cookie and the second cookie are sent to the client browser at a same time.

10. The method of claim 1, wherein the first cookie and the second cookie are sent to the client browser at different times.

11. The method of claim 1, wherein the first and second cookies are independently authenticable by the web server.

12. A web server device, comprising
    a communication interface to communicate with one or more client devices;
    a processing circuit coupled to the communication interface, wherein the processing circuit is configured to:
    establish a web session with a client browser operating on a client device;

generate a first cookie and a second cookie, wherein the first cookie is restricted to be used with a locally-triggered request, from the client browser to the web server, that is user-initiated or triggered by web content received by the client browser from the web server, and wherein the second cookie is restricted to be used with an externally-triggered request, from the client browser to the web server, that is triggered by web content received by the client browser from a website external to the web server;

send the first and second cookies to the client browser via a network;

receive a request from the client browser that is accompanied by a cookie;

determine whether the accompanying cookie is the first cookie or the second cookie; and wherein the accompanying cookie is selected by the client browser based on the client browser's determination on whether the request is locally or externally triggered.

13. The web server device of claim 12, wherein the processing circuit is further configured to:

process the request according to privileges associated with the accompanying first cookie or second cookie.

14. The web server device of claim 12, wherein if the request is accompanied by the first cookie, the request is allowed by the processing circuit to make state changes to the web session.

15. The web server device of claim 12, wherein if the request is accompanied by the second cookie, the request is not permitted by the processing circuit to make state changes to the web session.

16. The web server device of claim 12, where either the first cookie or the second cookie is used in the request from the client browser but not both.

17. A web server device, comprising:

means for establishing a web session with a client browser operating on a client device;

means for generating a first cookie and a second cookie, wherein the first cookie is restricted to be used with a locally-triggered request, from the client browser to the web server, that is user-initiated or triggered by web content received by the client browser from the web server, and wherein the second cookie is restricted to be used with an externally-triggered request, from the client browser to the web server, that is triggered by web content received by the client browser from a website external to the web server;

means for sending the first and second cookies to the client browser via a network;

means for receiving a request from the client browser that is accompanied by a cookie;

means for determining whether the accompanying cookie is the first cookie or the second cookie; and wherein the accompanying cookie is selected by the client browser based on the client browser's determination on whether the request is locally or externally triggered.

18. The web server device of claim 17, further comprising:

means for processing the request according to privileges associated with the accompanying first cookie or second cookie.

19. A processor-readable non-transitory medium having instructions stored thereon, which when executed by at least one processor causes the at least one processor to:

establish by a web server a web session with a client browser operating on a client device;

generate at the web server a first cookie and a second cookie, wherein the first cookie is restricted to be used with a locally-triggered request, from the client browser to the web server, that is user-initiated or triggered by web content received by the client browser from the web server, and wherein the second cookie is restricted to be used with an externally-triggered request, from the client browser to the web server, that is triggered by web content received by the client browser from a website external to the web server;

send the first and second cookies to the client browser via a network;

receive a request from the client browser that is accompanied by a cookie;

determine whether the accompanying cookie is the first cookie or the second cookie; and wherein the accompanying cookie is selected by the client browser based on the client browser's determination on whether the request is locally or externally triggered.

20. A method operational on a client browser on a client device, comprising:

receiving a first cookie and a second cookie from a web server, wherein the first cookie is restricted to be used with a locally-triggered request, from the client browser to the web server, that is user-initiated or triggered by web content received by the client browser from the web server, and wherein the second cookie is restricted to be used with an externally-triggered request, from the client browser to the web server, that is triggered by web content received by the client browser from a website external to the web server;

initiating an operation within the web session by sending at least one of the first cookie or the second cookie to the web server;

determining whether a request from the client browser to the web server is locally or externally triggered; and sending the request accompanied by at least one of the first cookie or the second cookie depending on the determination.

21. The method of claim 20, further comprising:

establishing the web session with the web server to obtain access to a website.

22. The method of claim 20, wherein the externally-triggered request includes a cross-site request.

23. The method of claim 20, wherein if the request is accompanied by the first cookie, the request is allowed by the web server to make state changes to the web session.

24. The method of claim 20, wherein if the request is accompanied by the second cookie, the request is not permitted by the web server to make state changes to the web session.

25. The method of claim 20, where either the first cookie or the second cookie is used in the request from the client browser but not both.

26. The method of claim 20, wherein the first cookie is associated with first privileges which are different from second privileges associated with the second cookie within the web session.

27. The method of claim 20, wherein the first cookie and the second cookie are both associated with same privileges within the web session.

28. A client device, comprising a communication interface to communicate with one or more web servers;

a processing circuit coupled to the communication interface, wherein the processing circuit is configured to:

receive a first cookie and a second cookie from a web server, wherein the first cookie is restricted to be used with a locally-triggered request, from a client browser of the client device to the web server, that is user-initiated or triggered by web content received by the client browser from the web server, and wherein the second cookie is restricted to be used with an externally-triggered request, from the client browser to the web server, that is triggered by web content received by the client browser from a website external to the web server;

initiate an operation within the web session by sending at least one of the first cookie or the second cookie to the web server;

determine whether a request from the client browser to the web server is locally or externally triggered; and send the request accompanied by at least one of the first cookie or the second cookie depending on the determination.

29. A client device, comprising:

means for receiving a first cookie and a second cookie from a web server, wherein the first cookie is restricted to be used with a locally-triggered request, from a client browser of the client device to the web server, that is user-initiated or triggered by web content received by the client browser from the web server, and wherein the second cookie is restricted to be used with an externally-triggered request, from the client browser to the web server, that is triggered by web content received by the client browser from a website external to the web server;

means for initiating an operation within the web session by sending at least one of the first cookie or the second cookie to the web server;

means for determining whether a request from the client browser to the web server is locally or externally triggered; and means for sending the request accompanied by at least one of the first cookie or the second cookie depending on the determination.

30. A processor-readable non-transitory medium having instructions stored thereon, which when executed by at least one processor causes the at least one processor to:

receive a first cookie and a second cookie from a web server, wherein the first cookie is restricted to be used with a locally-triggered request, from a client browser to the web server, that is user-initiated or triggered by web content received by the client browser from the web server, and wherein the second cookie is restricted to be used with an externally-triggered request, from the client browser to the web server, that is triggered by web content received by the client browser from a website external to the web server;

initiate an operation within the web session by sending at least one of the first cookie or the second cookie to the web server;

determine whether a request from the client browser to the web server is locally or externally triggered; and send the request accompanied by at least one of the first cookie or the second cookie depending on the determination.

* * * * *